US012754458B2

(12) United States Patent
Jiang et al.

(10) Patent No.: US 12,754,458 B2
(45) Date of Patent: Oct. 6, 2026

(54) IMAGE CAPTURING EQUIPMENT

(71) Applicant: Chicony Electronics Co., Ltd., New Taipei City (TW)

(72) Inventors: Yi-Sing Jiang, New Taipei City (TW); Kung Ta Tsai, New Taipei City (TW)

(73) Assignee: Chicony Electronics Co., Ltd., New Taipei City (TW)

( * ) Notice: Subject to any disclaimer, the term of this patent is extended or adjusted under 35 U.S.C. 154(b) by 190 days.

(21) Appl. No.: 18/654,003

(22) Filed: May 3, 2024

(65) Prior Publication Data

US 2025/0216749 A1 Jul. 3, 2025

(30) Foreign Application Priority Data

Dec. 28, 2023 (TW) ................................ 112151208

(51) Int. Cl.
*H04N 23/695* (2023.01)
*G03B 17/02* (2021.01)
*G03B 17/56* (2021.01)

(52) U.S. Cl.
CPC ........... *G03B 17/02* (2013.01); *G03B 17/561* (2013.01); *H04N 23/695* (2023.01)

(58) Field of Classification Search
CPC ........... G08B 13/19623; F16M 11/123; F16M 13/022
See application file for complete search history.

(56) References Cited

U.S. PATENT DOCUMENTS

| | | | | |
|---|---|---|---|---|
| 10,341,570 B1 * | 7/2019 | Kong | H04N 23/69 |
| 10,388,133 B1 * | 8/2019 | Kondou | G03B 17/00 |
| 10,612,663 B2 * | 4/2020 | Little | F16J 15/3224 |
| 10,692,341 B2 * | 6/2020 | Hoyer | H04N 23/57 |
| 2007/0126872 A1 * | 6/2007 | Bolotine | H04N 7/181 348/E7.086 |

FOREIGN PATENT DOCUMENTS

TW 201640046 11/2016

OTHER PUBLICATIONS

"Office Action of Taiwan Counterpart Application", issued on Nov. 19, 2024, p. 1-p. 5.

* cited by examiner

*Primary Examiner* — Leon W Rhodes, Jr.
(74) *Attorney, Agent, or Firm* — JCIPRNET

(57) ABSTRACT

An image capturing equipment includes a main body and at least one image capturing module. The at least one image capturing module includes a moving assembly and an image capturing unit. The moving assembly is disposed on the main body movably along a moving path. The moving path encircles a central axis of the main body. The image capturing unit is rotatably disposed on the moving assembly.

19 Claims, 22 Drawing Sheets

IMAGE CAPTURING EQUIPMENT

CROSS-REFERENCE TO RELATED APPLICATION

This application claims the priority benefit of Taiwan application serial no. 112151208, filed on Dec. 28, 2023. The entirety of the above-mentioned patent application is hereby incorporated by reference herein and made a part of this specification.

BACKGROUND

Technical Field

The disclosure relates to an image capturing equipment, and more particularly, to a rotatable image capturing equipment.

Related Art

Generally, when applied to different scenarios, outdoor security cameras are adjusted to different angles to perform monitoring. In the outdoor security cameras currently on the market, the angle is generally adjusted by three rotational degrees of freedom. However, an existing security camera is only capable of rotating on its own axes at its mounting position and is not sufficient for applying to all monitoring scenarios. Thus, how to make an outdoor security camera applicable to various monitoring scenarios is a topic to be explored in the art.

SUMMARY

The disclosure provides an image capturing equipment adaptable to various monitoring scenarios and exhibiting improved versatility.

An image capturing equipment according to an embodiment of the disclosure includes a main body and at least one image capturing module. The at least one image capturing module includes a moving assembly and an image capturing unit. The moving assembly is disposed on the main body movably along a moving path. The moving path encircles a central axis of the main body. The image capturing unit is rotatably disposed on the moving assembly.

In an embodiment of the disclosure, the image capturing equipment further includes a track. The track is disposed on the main body and extends along the moving path. The moving assembly is movably disposed on the track.

In an embodiment of the disclosure, the track is an annular track.

In an embodiment of the disclosure, the annular track includes a plurality of arc-shaped tracks that are spliced to each other.

In an embodiment of the disclosure, the image capturing equipment further includes at least one damping member. The at least one damping member is disposed between the track and the moving assembly.

In an embodiment of the disclosure, the moving assembly includes a slider and a rotating assembly. The slider is disposed on the main body slidably along the moving path. The rotating assembly is rotatably connected to the slider along a first rotation axis. The image capturing unit is disposed on the rotating assembly.

In an embodiment of the disclosure, the first rotation axis is parallel to the central axis.

In an embodiment of the disclosure, the image capturing equipment further includes at least one damping member. The at least one damping member is disposed between the slider and the rotating assembly.

In an embodiment of the disclosure, the rotating assembly includes a first rotating member and a second rotating member. The first rotating member is rotatably connected to the slider along the first rotation axis. The second rotating member is rotatably connected to the first rotating member along a second rotation axis. The image capturing unit is disposed on the second rotating member.

In an embodiment of the disclosure, the second rotation axis is perpendicular to the first rotation axis.

In an embodiment of the disclosure, the second rotation axis is perpendicular to the central axis.

In an embodiment of the disclosure, the image capturing equipment further includes at least one damping member. The at least one damping member is disposed between the first rotating member and the second rotating member.

In an embodiment of the disclosure, the image capturing unit is rotatably disposed on the second rotating member along a third rotation axis.

In an embodiment of the disclosure, the third rotation axis is perpendicular to the second rotation axis.

In an embodiment of the disclosure, the third rotation axis coincides with an optical axis of the image capturing unit.

In an embodiment of the disclosure, the image capturing equipment further includes at least one damping member. The at least one damping member is disposed between the second rotating member and the image capturing unit.

In an embodiment of the disclosure, the first rotating member has at least one stopper, and the second rotating member has at least another stopper. The at least one stopper and the at least another stopper are adapted to stop each other to limit a range of a rotation angle of the second rotating member with respect to the first rotating member.

In an embodiment of the disclosure, the slider has at least one stopper, and the rotating assembly has at least another stopper. The at least one stopper and the at least another stopper are adapted to stop each other to limit a range of a rotation angle of the rotating assembly with respect to the slider.

In an embodiment of the disclosure, the at least one image capturing module includes a plurality of image capturing modules. Any one of the image capturing modules is adapted to move along the moving path with respect to the other image capturing modules among the image capturing modules.

In an embodiment of the disclosure, the image capturing equipment further includes a mounting bracket. The mounting bracket is connected to the main body, and the central axis passes through the mounting bracket.

Thus, in the image capturing equipment of the disclosure, the image capturing module not only includes the image capturing unit rotatable on its own axis, but also includes the moving assembly capable of revolving around the main body. Accordingly, a user may change the position of the image capturing module with respect to the main body by the revolution and adjust the rotation angle of the image capturing unit itself by the axial rotation to adapt to various monitoring scenarios. Thus, the image capturing equipment of the disclosure exhibits improved versatility.

To make the aforementioned more comprehensible, several embodiments accompanied with drawings are described in detail as follows.

BRIEF DESCRIPTION OF DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF EMBODIMENTS

For convenience and clarity of illustration, the thickness or dimensions of each component in the figures are represented in an exaggerated, omitted, or schematic manner for the understanding and reading of those skilled in the art. The dimensions of each component may not exactly reflect the actual dimensions and are not intended to limit the conditions under which the disclosure may be implemented, so the illustrated dimensions do not have substantive technical significance. Any modifications to structure, changes in proportion, or adjustments in dimensions should still fall within the scope of the technical content disclosed in the disclosure as long as they do not affect the effects that the disclosure can produce and the objectives that the disclosure can achieve. In all figures, the same reference signs will be used to represent the same or similar components.

Figure 1:
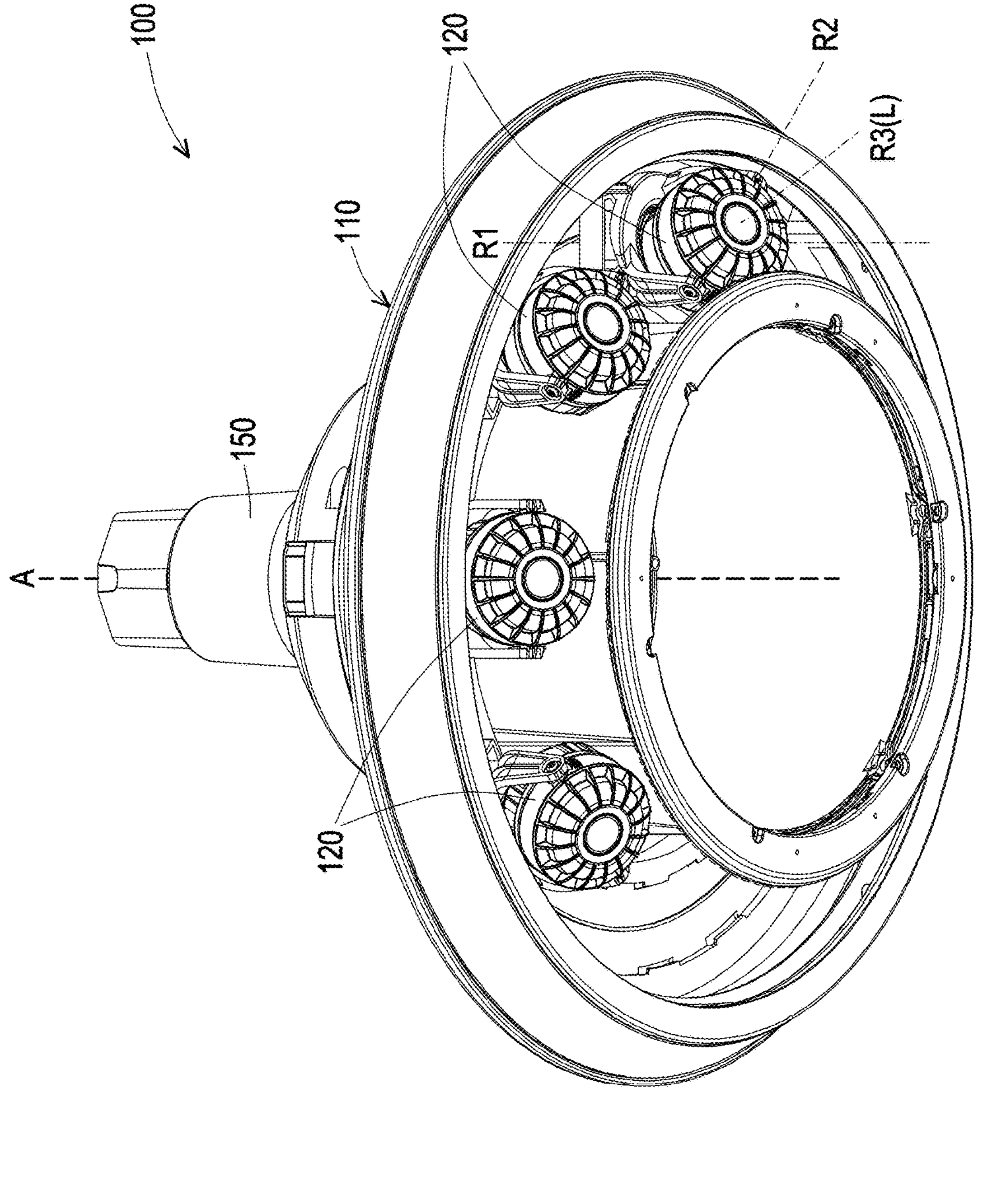
FIG. 1 is a schematic view of an image capturing equipment according to an embodiment of the disclosure.
Figure 2:
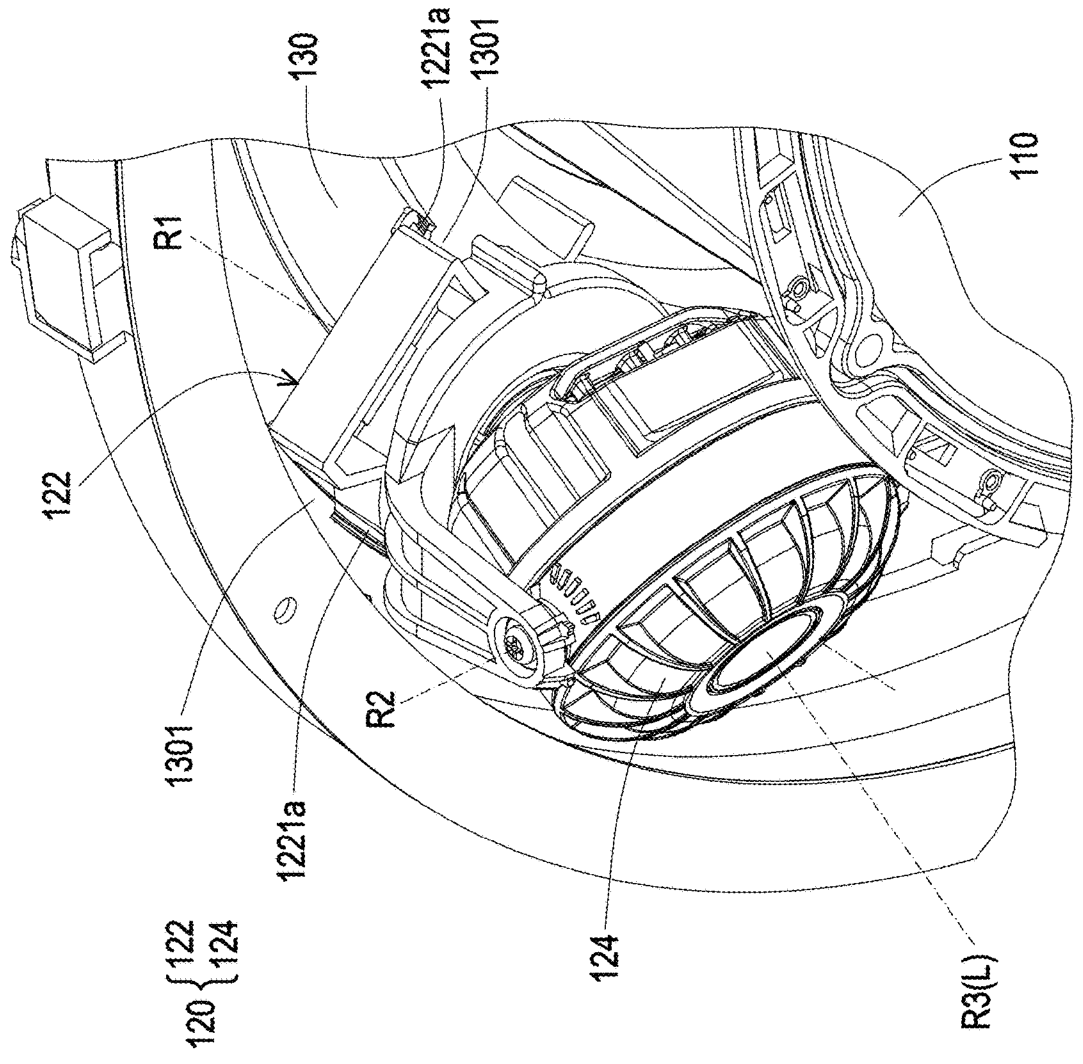
FIG. 2 is a partial enlarged view of the image capturing equipment in FIG. 1.
Figure 3A:
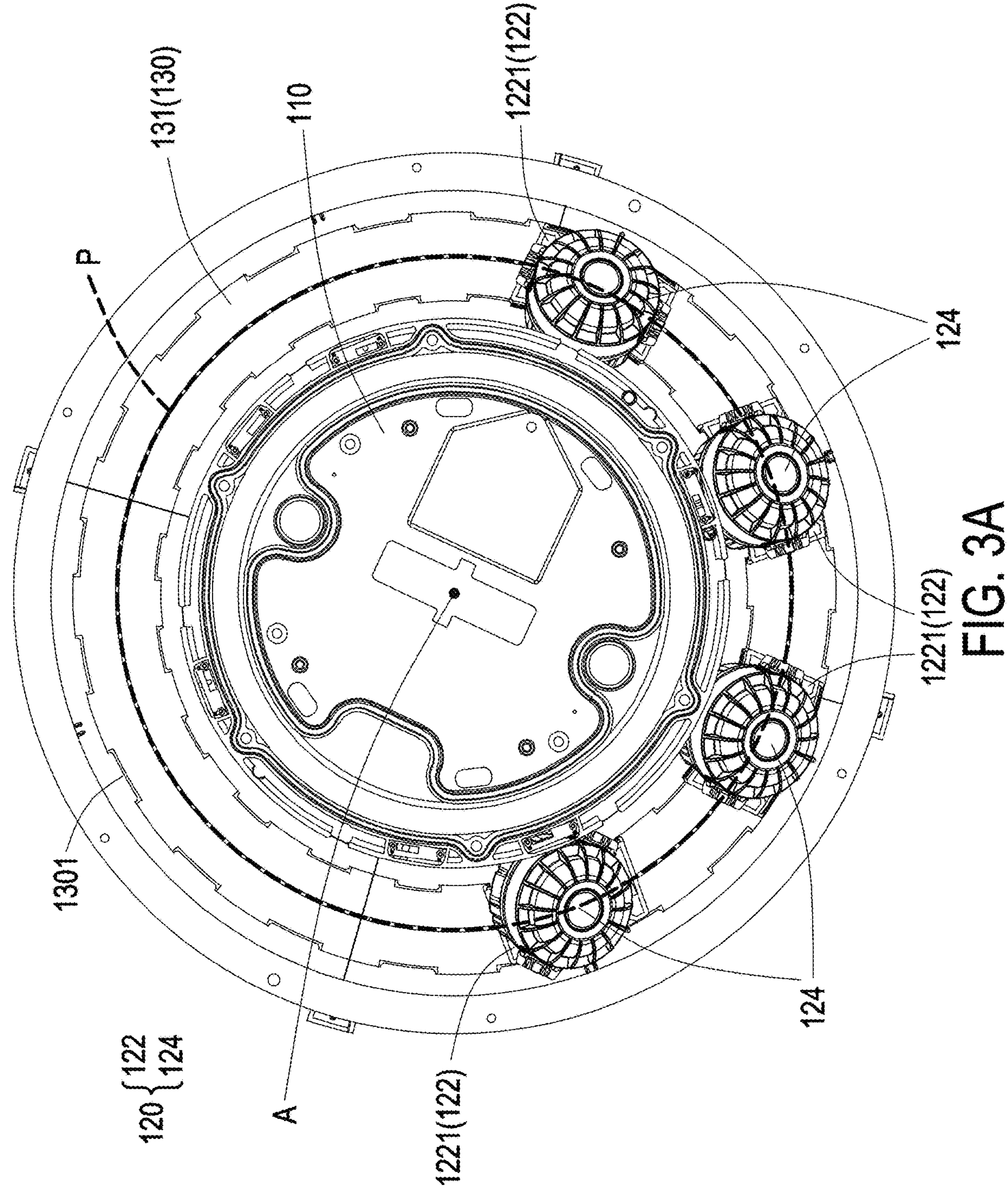
FIG. 3A is a schematic view of image capturing modules in FIG. 1 disposed on a main body along a moving path.

FIG. 1 is a schematic view of an image capturing equipment according to an embodiment of the disclosure. FIG. 2 is a partial enlarged view of the image capturing equipment in FIG. 1. FIG. 3A is a schematic view of image capturing modules in FIG. 1 disposed on a main body along a moving path. Referring to FIG. 1 to FIG. 3A, an image capturing equipment 100 of this embodiment includes a main body 110, a plurality of image capturing modules 120, and a track 130. The track 130 is disposed on the main body 110 and extends along a moving path P. The moving path P encircles a central axis A of the main body 110. The image capturing module 120 includes a moving assembly 122 and an image capturing unit 124. The moving assembly 122 is slidably provided on the track 130 and is disposed on the main body 110 movably along the moving path P. The image capturing unit 124 is rotatably disposed on the moving assembly 122. In this embodiment, the moving path P is a circular path, but the disclosure is not limited thereto. In other embodiments, the moving path P may be a path of another suitable shape.

As described above, in the image capturing equipment 100 of this embodiment, the image capturing module 120 not only includes the image capturing unit 124 rotatable on its own axis, but also includes the moving assembly 122 capable of revolving around the main body 110. Accordingly, a user may change the position of the image capturing module 120 with respect to the main body 110 by the revolution and adjust the rotation angle of the image capturing unit 124 itself by the axial rotation to adapt to various monitoring scenarios. Thus, the image capturing equipment 100 of this embodiment exhibits improved versatility.

In this embodiment, the quantity of the image capturing modules 120 is four, but the quantity of the image capturing modules 120 is not limited thereto.

Figure 3B:
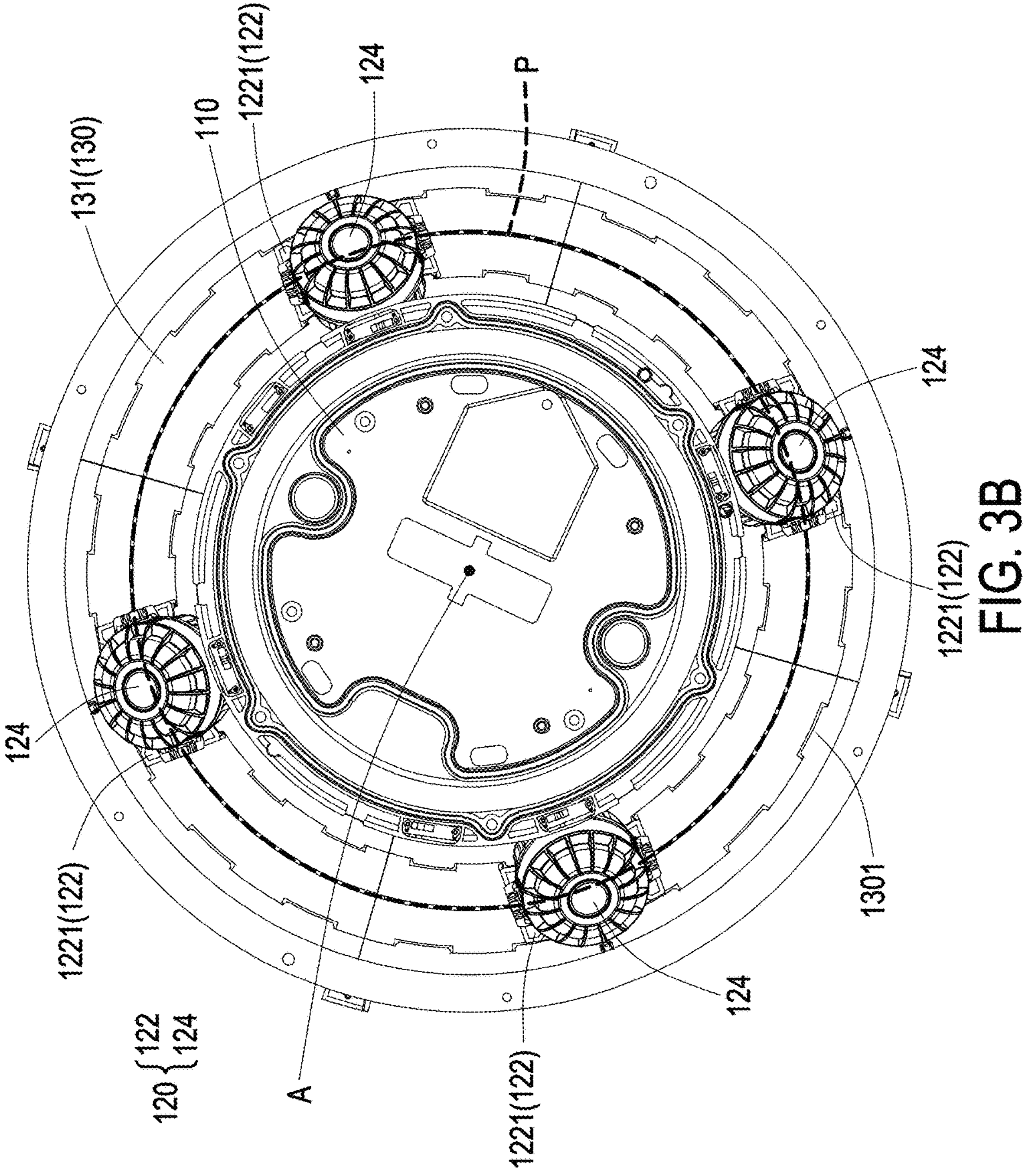
FIG. 3B illustrates movement of the image capturing modules in FIG. 3A along the moving path.

FIG. 3B illustrates movement of the image capturing modules in FIG. 3A along the moving path. Any image capturing module 120 among these image capturing modules 120 is adapted to move along the moving path P with respect to the other image capturing modules 120 among these image capturing modules 120. For example, these image capturing modules 120 may move from the positions shown in FIG. 3A to the positions shown in FIG. 3B. Such a design enables the image capturing equipment 100 to adapt to various monitoring scenarios.

Figure 4:
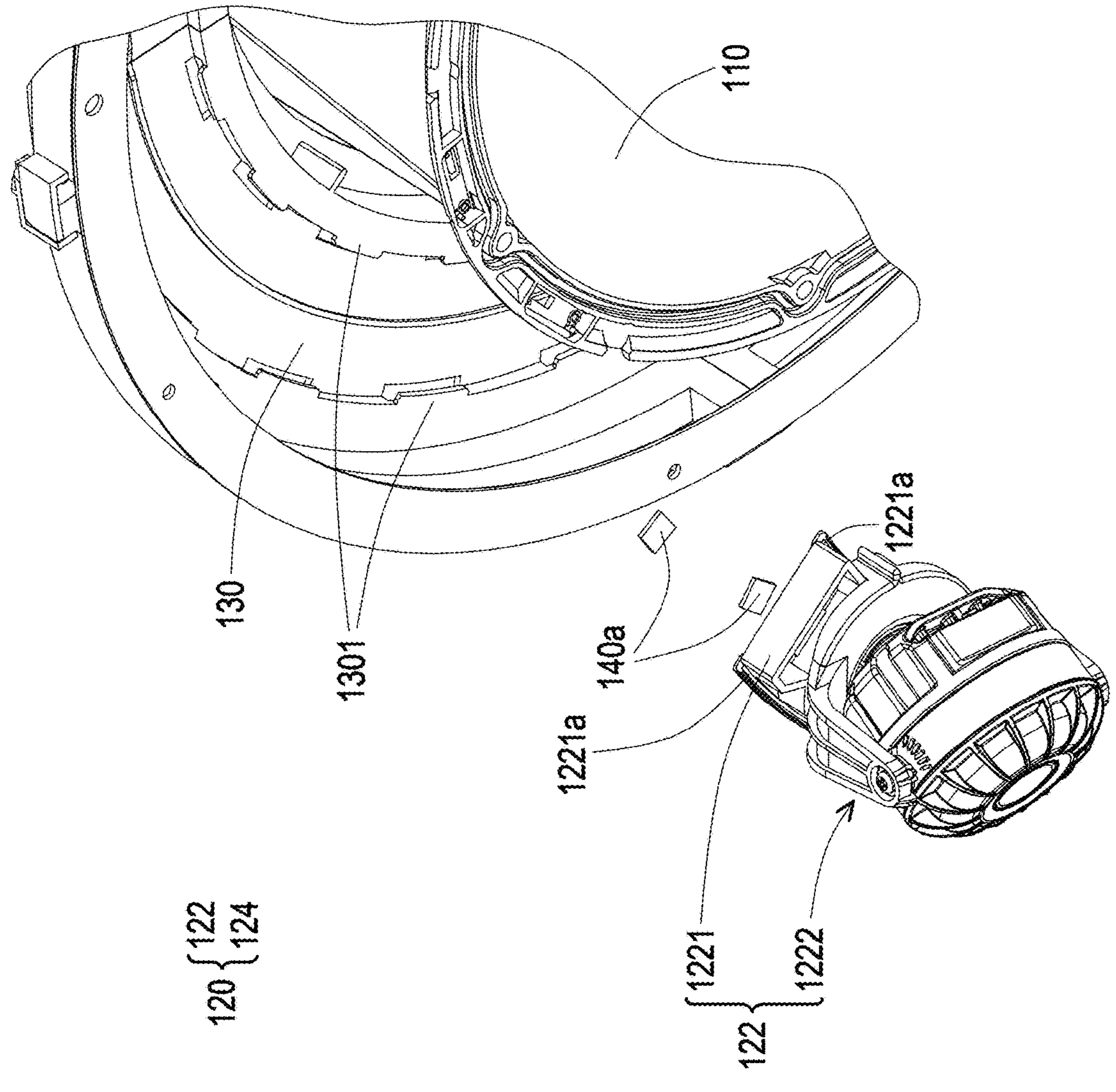
FIG. 4 is an exploded view of the image capturing equipment in FIG. 2.
Figure 5:
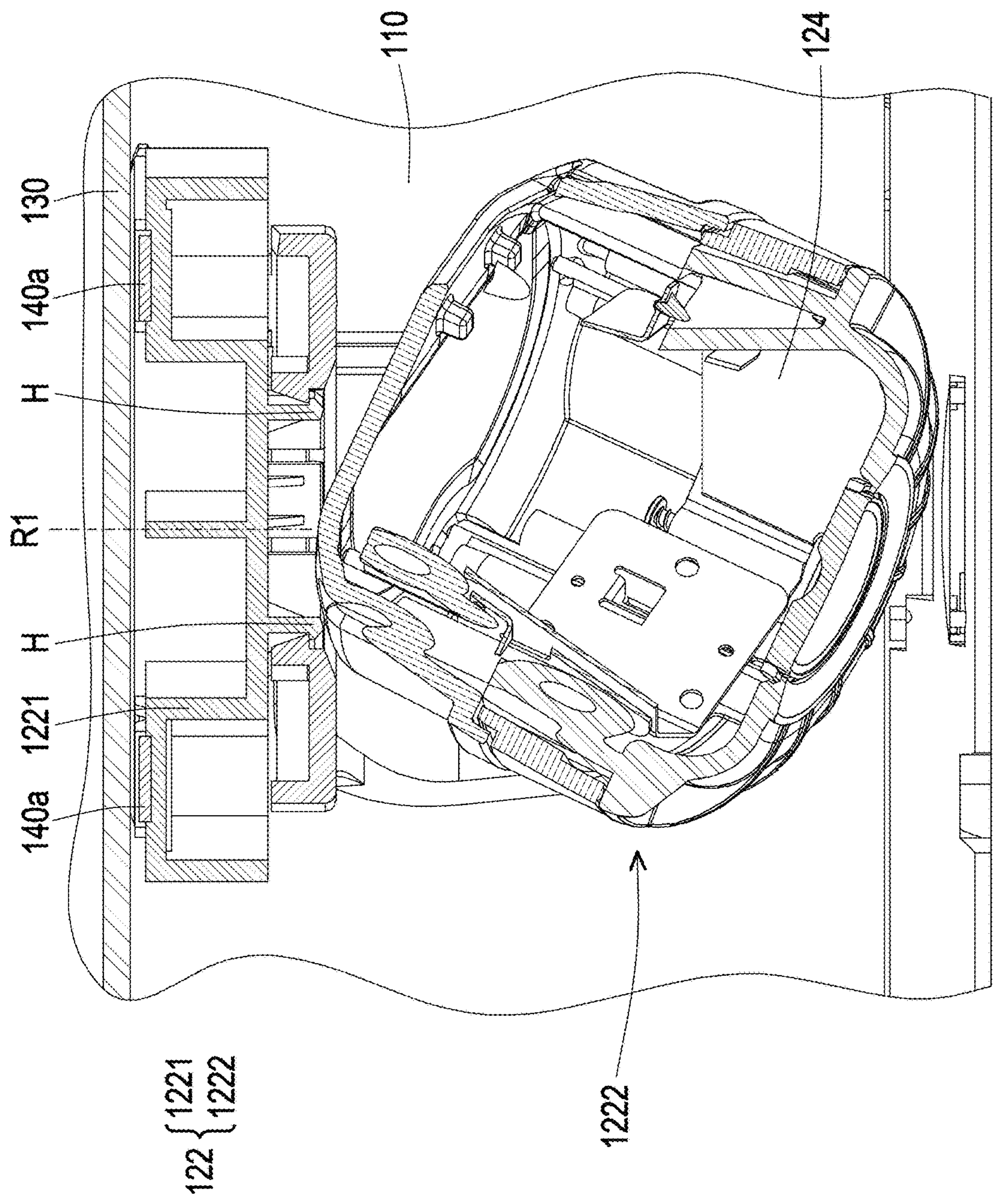
FIG. 5 is a partial cross-sectional view of the image capturing equipment in FIG. 2.

FIG. 4 is an exploded view of the image capturing equipment in FIG. 2. FIG. 5 is a partial cross-sectional view of the image capturing equipment in FIG. 2. Referring to FIG. 3A to FIG. 5, in detail, the moving assembly 122 of this embodiment includes a slider 1221 and a rotating assembly 1222. The slider 1221 and the rotating assembly 1222 are rotatably connected with each other. The slider 1221 is slidably provided on the track 130 and is provided on the main body 110 slidably along the moving path P. Position limitation between the track 130 and the slider 1221 is created by a first limiting member 1301 and a second limiting member 1221*a*, such that the slider 1221 does not fall off the track 130 and is slidable along the track 130. In this embodiment, the first limiting member 1301 is, for example, a limiting protrusion included at the track 130, and the second limiting member 1221*a* is, for example, a limiting protruding edge included at the slider 1221, but the disclosure is not limited thereto.

Figure 6A:
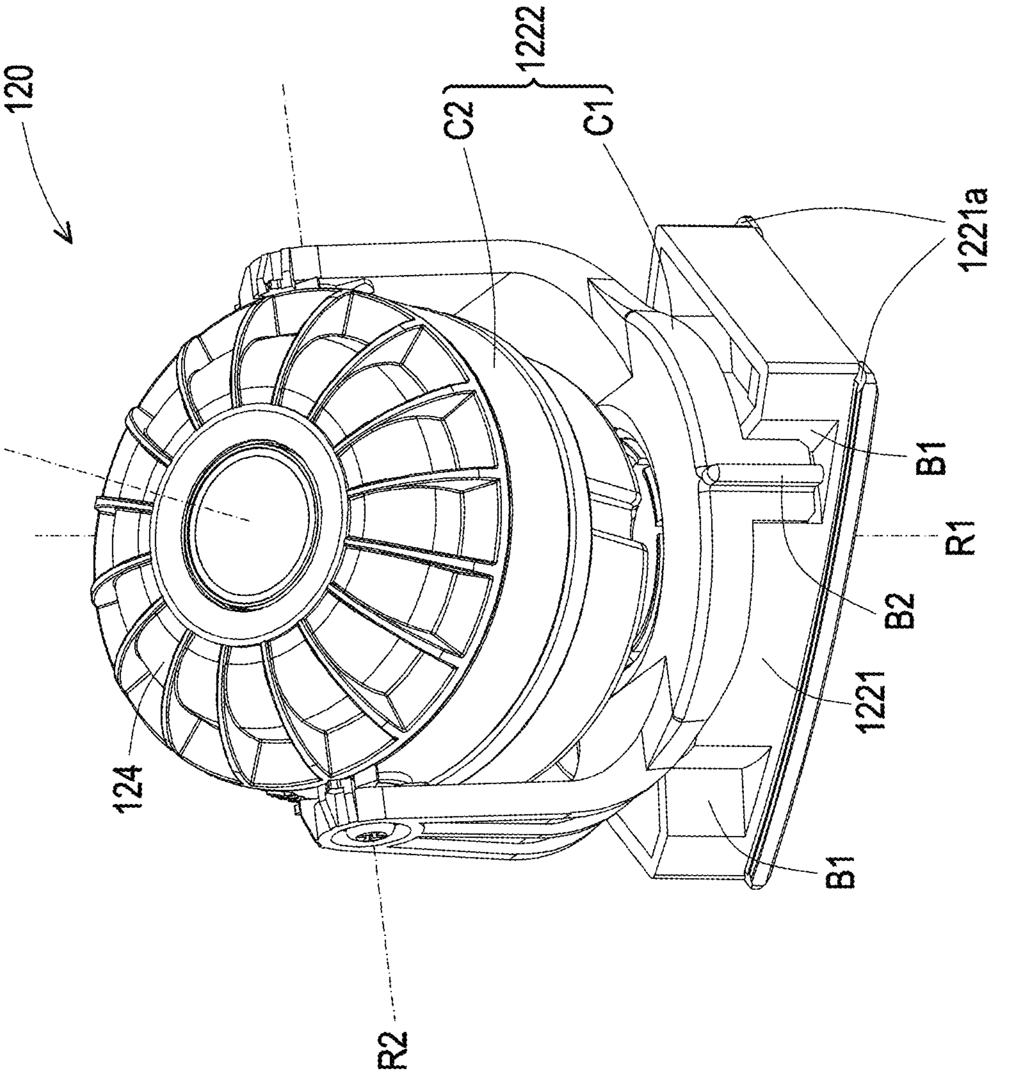
FIG. 6A is a perspective view of the image capturing module in FIG. 2.
Figure 6B:
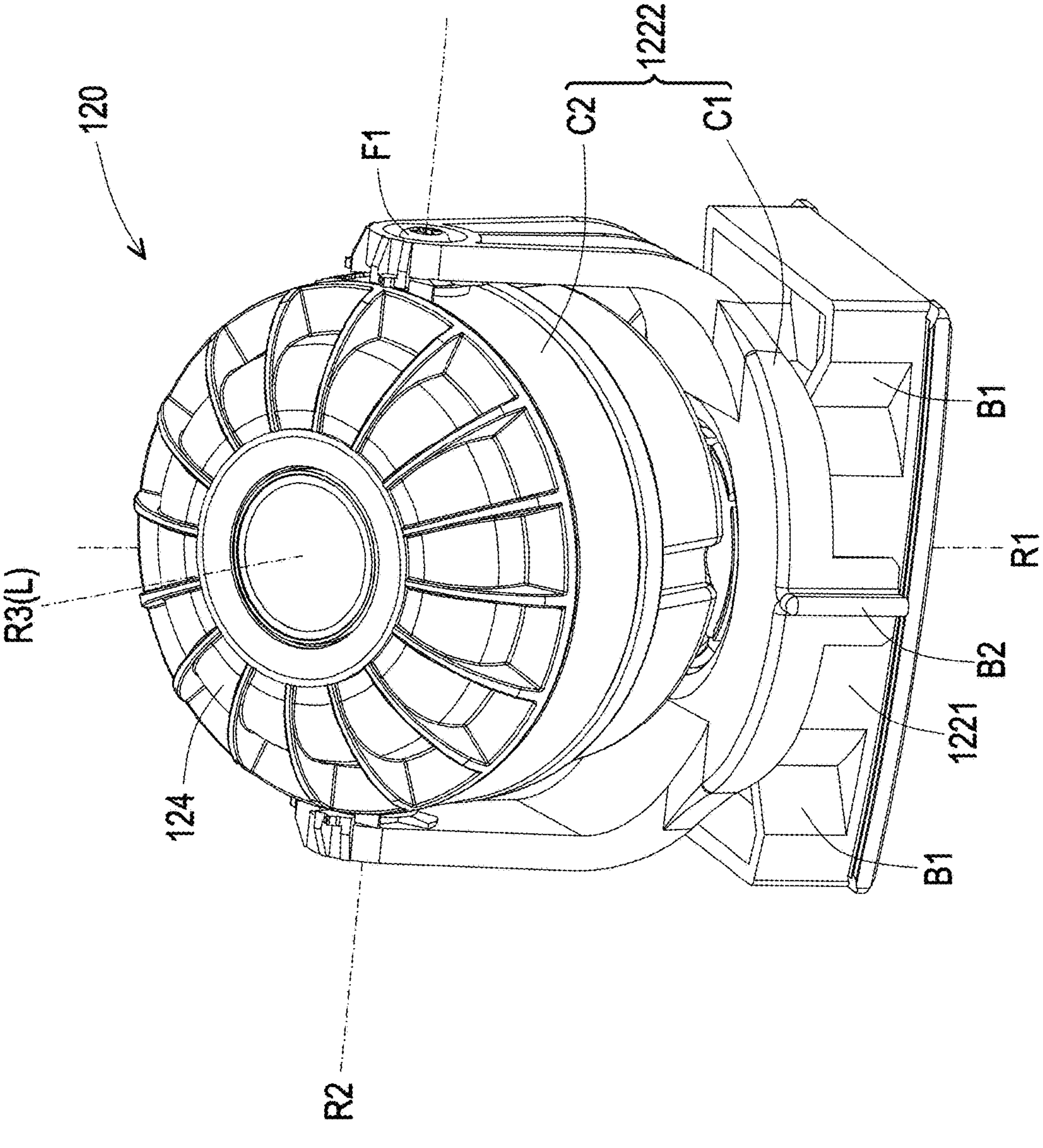
FIG. 6B illustrates rotation of the image capturing module in FIG. 6A on a first rotation axis.
Figure 7:
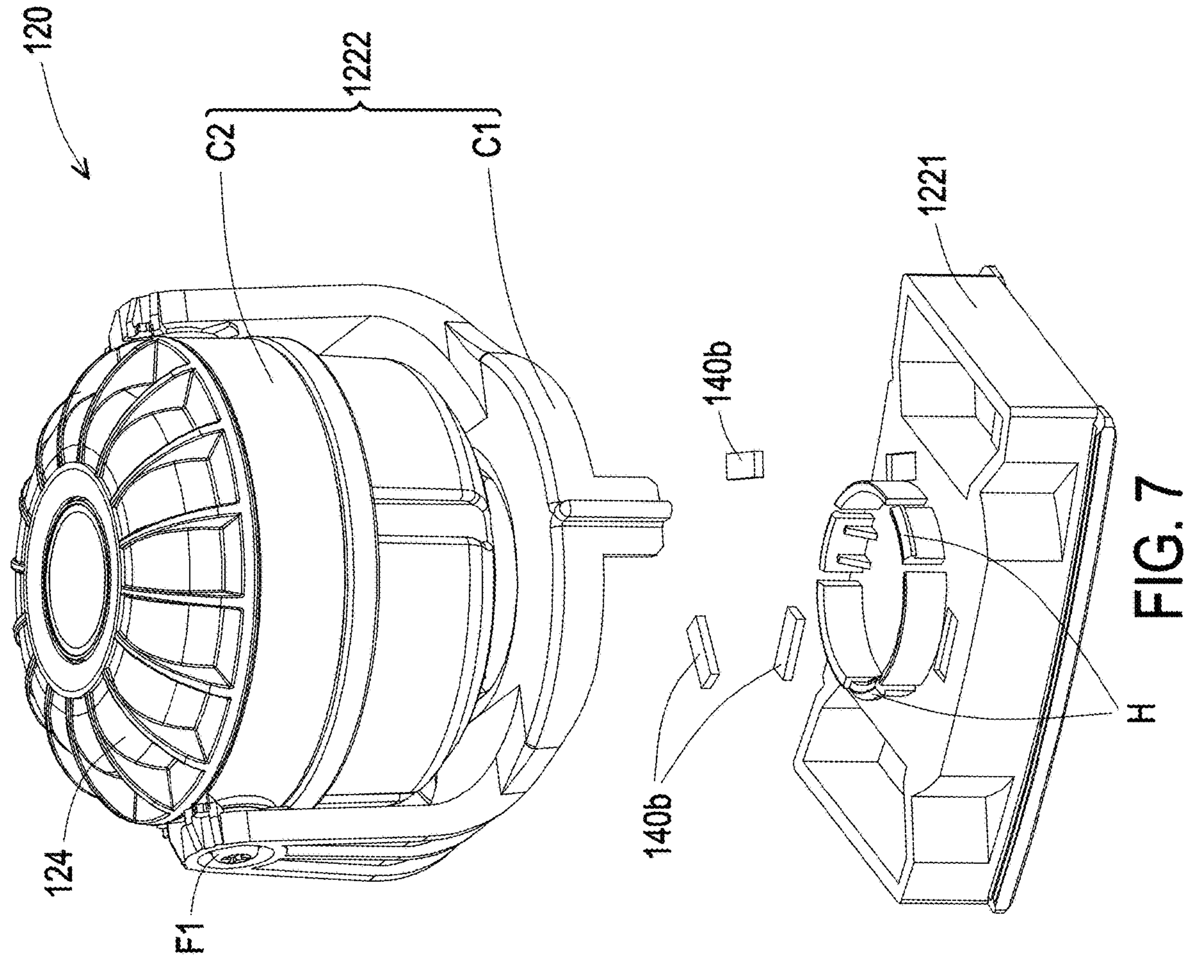
FIG. 7 is an exploded view of the image capturing module in FIG. 6A.
Figure 8:
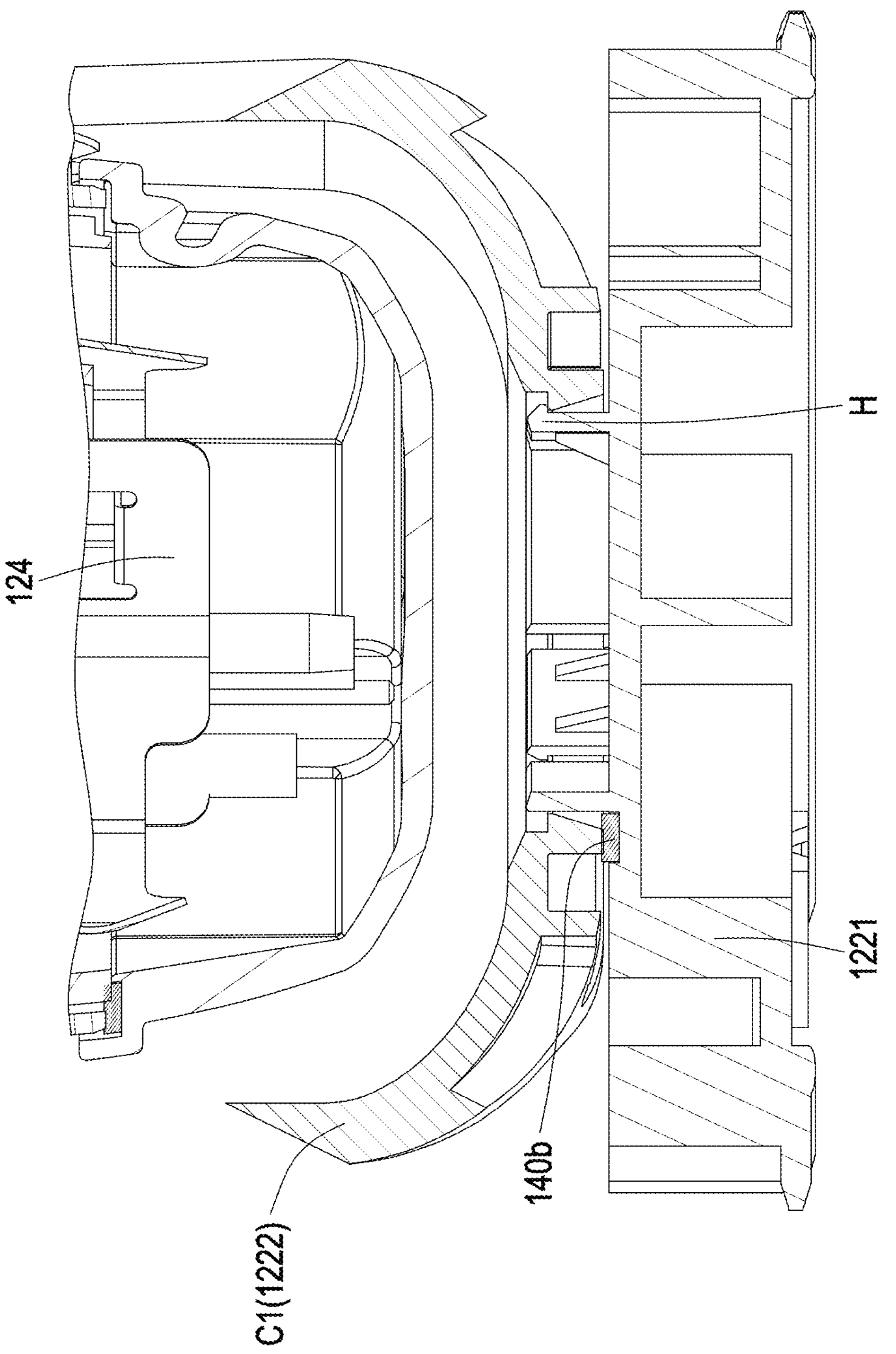
FIG. 8 is a partial cross-sectional view of the image capturing module in FIG. 6A.

FIG. 6A is a perspective view of the image capturing module in FIG. 2. FIG. 6B illustrates rotation of the image capturing module in FIG. 6A on a first rotation axis. FIG. 7 is an exploded view of the image capturing module in FIG. 6A. FIG. 8 is a partial cross-sectional view of the image capturing module in FIG. 6A. Referring to FIG. 6A to FIG.

8, in more detail, the rotating assembly 1222 of this embodiment includes a first rotating member C1 and a second rotating member C2. The first rotating member C1 and the second rotating member C2 are rotatably connected with each other. A hook H of the slider 1221 is connected with the first rotating member C1, such that the first rotating member C1 and the slider 1221 do not separate from each other in a direction parallel to the first rotation axis R1, and the first rotating member C1 is rotatable with respect to the slider 1221 along the first rotation axis R1. The image capturing unit 124 is disposed on the rotating assembly 1222. When the rotating assembly 1222 rotates along the first rotation axis R1 with respect to the slider 1221 from the state shown in FIG. 6A to the state shown in FIG. 6B, the image capturing unit 124 also rotates with respect to the slider 1221 accordingly. In this embodiment, the first rotation axis R1 is parallel to the central axis A as shown in FIG. 1, but the disclosure is not limited thereto.

As shown in FIG. 6A, the slider 1221 of this embodiment has a stopper B1, and the first rotating member C1 of the rotating assembly 1222 has a stopper B2. The stopper B1 and the stopper B2 are adapted to stop each other to limit the range of the rotation angle of the rotating assembly 1222 with respect to the slider 1221.

Figure 9:
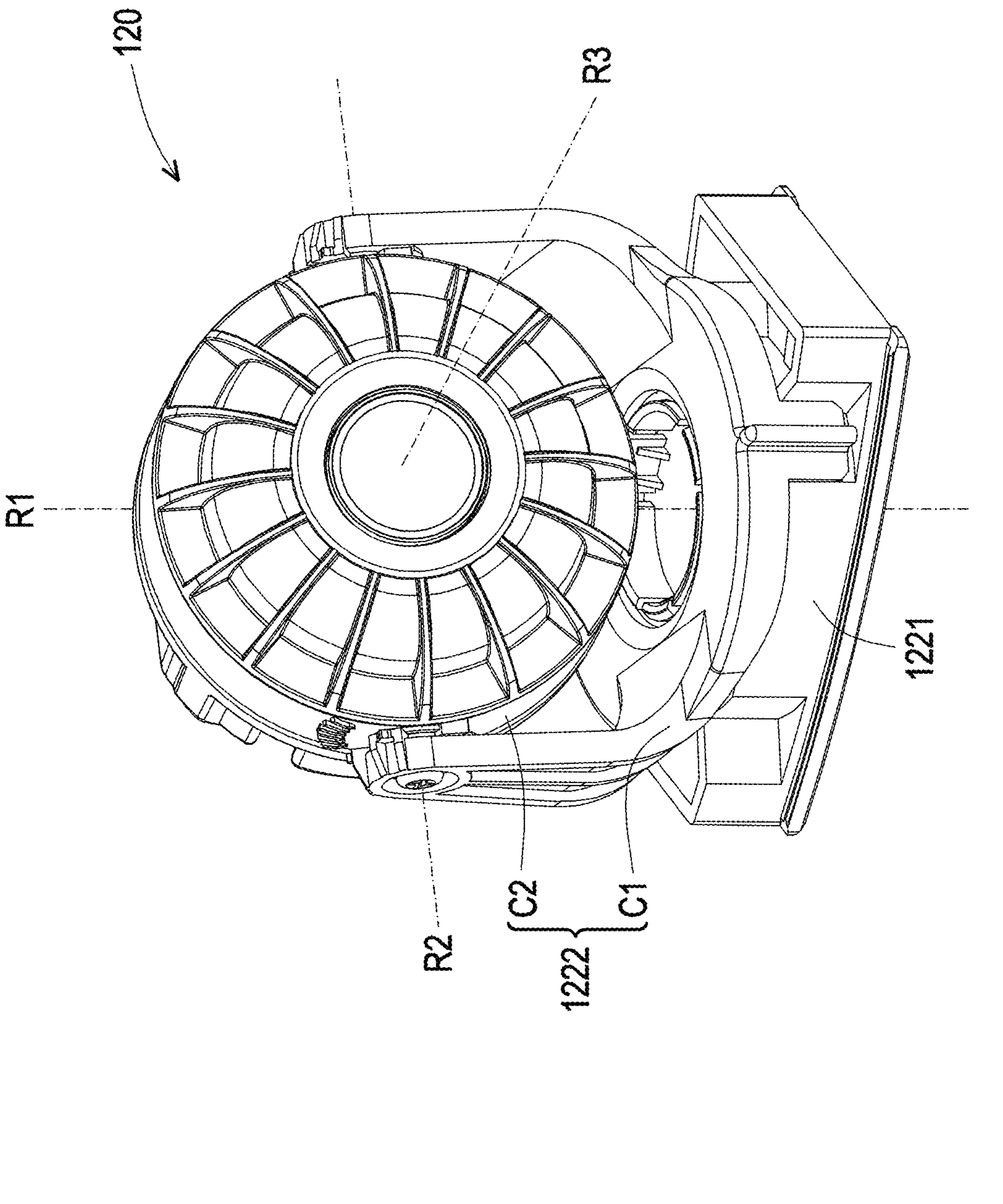
FIG. 9 illustrates rotation of the image capturing module in FIG. 6A on a second rotation axis.
Figure 10:
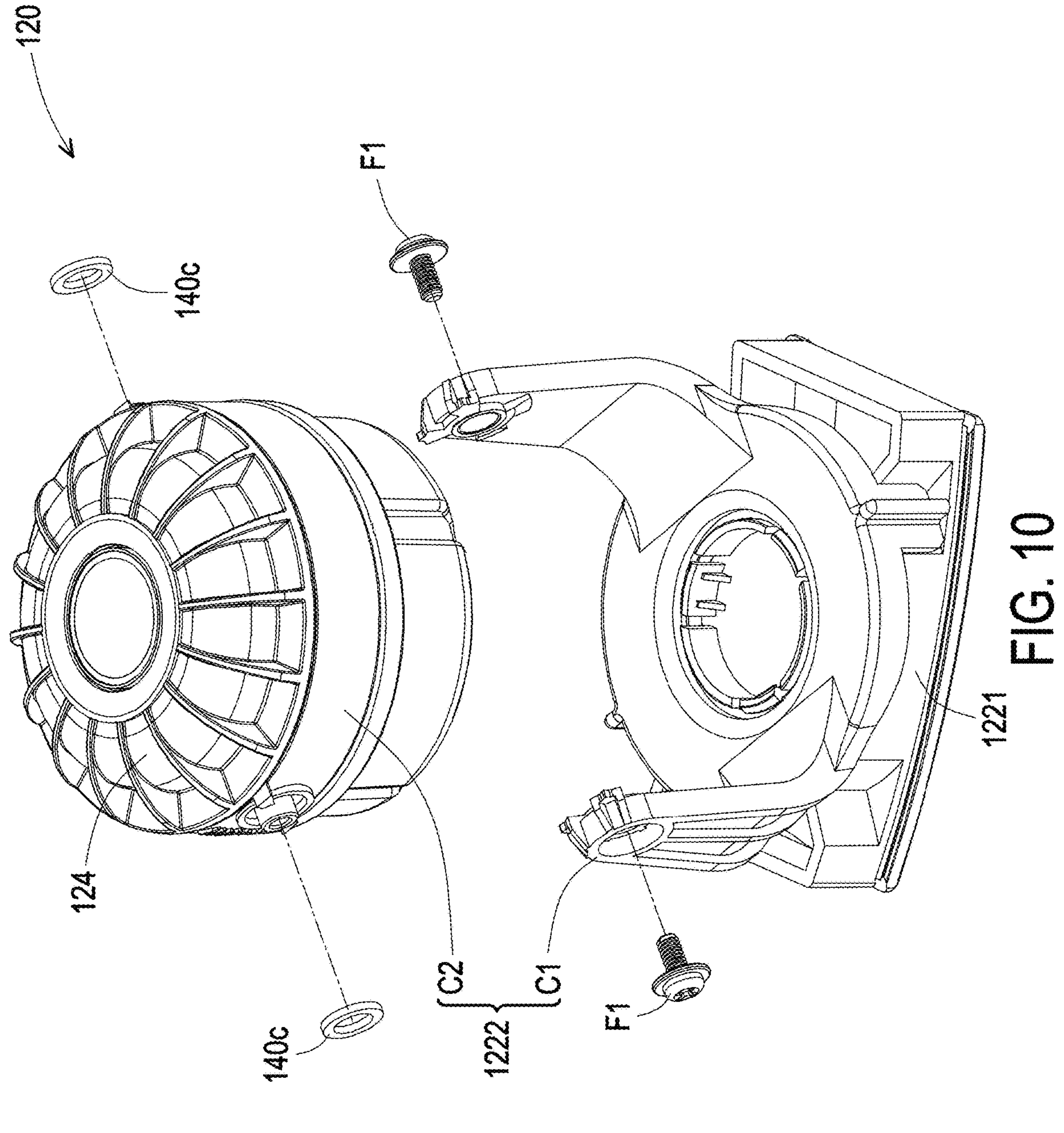
FIG. 10 is an exploded view of a rotating assembly in FIG. 6A.
Figure 11:
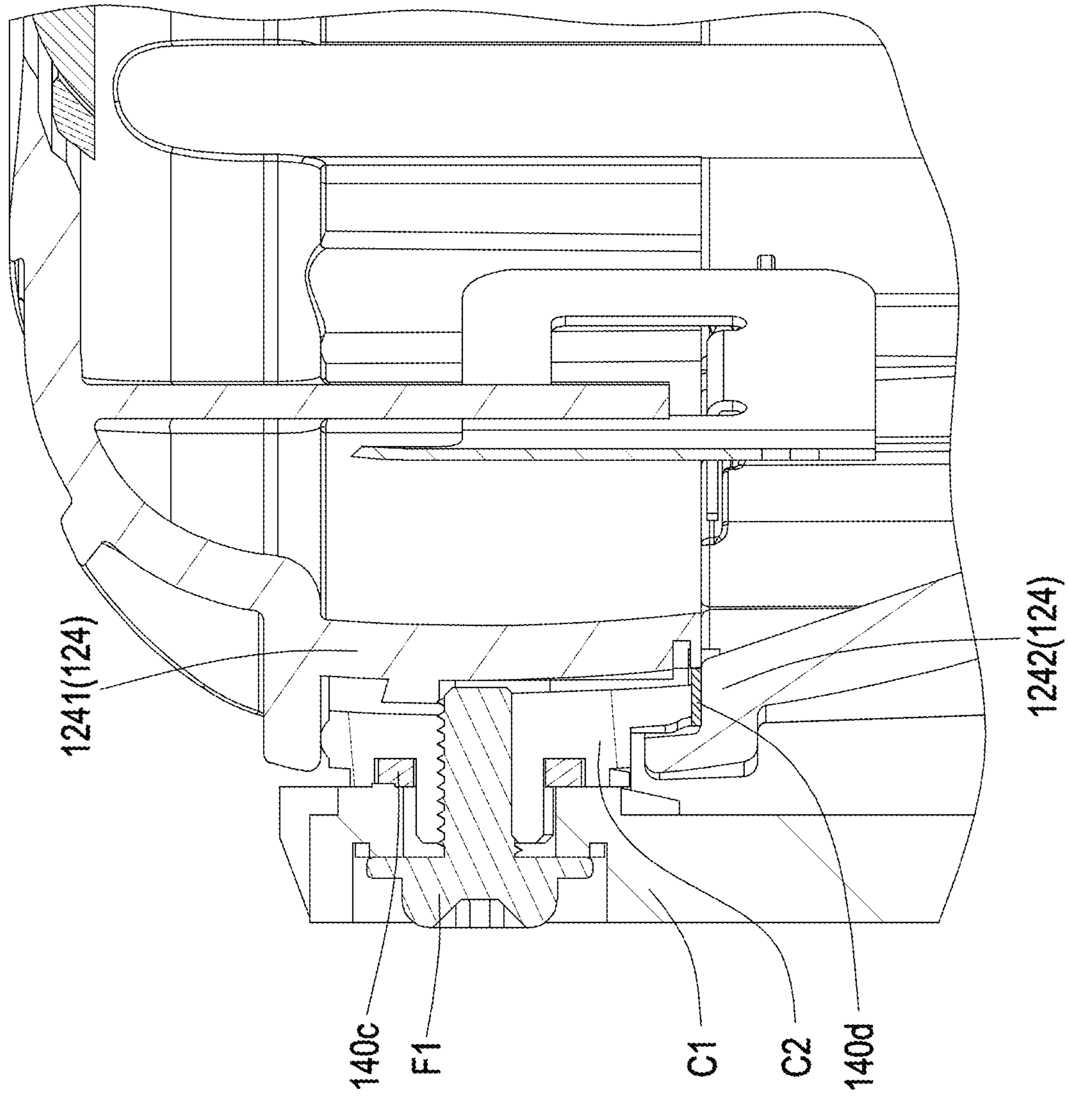
FIG. 11 is a partial cross-sectional view of the image capturing module in FIG. 6A.

FIG. 9 illustrates rotation of the image capturing module in FIG. 6A on a second rotation axis. FIG. 10 is an exploded view of the rotating assembly in FIG. 6A. FIG. 11 is a partial cross-sectional view of the image capturing module in FIG. 6A. Referring to FIG. 9 to FIG. 11, in more detail, two fasteners F1 (e.g., screws) are respectively passed through the first rotating member C1 and fastened to the second rotating member C2, such that the second rotating member C2 is rotatably connected to the first rotating member C1 along a second rotation axis R2. In addition, the image capturing unit 124 is disposed on the second rotating member C2. When the second rotating member C2 rotates along the second rotation axis R2 with respect to the first rotating member C1 from the state shown in FIG. 6A to the state shown in FIG. 9, the image capturing unit 124 also rotates with respect to the first rotating member C1 accordingly. The extending direction of the second rotation axis R2 is, for example, different from the extending direction of the first rotation axis R1. Specifically, in this embodiment, the second rotation axis R2 is perpendicular to the first rotation axis R1 and the central axis A as shown in FIG. 1, but the disclosure is not limited thereto.

Figure 12:
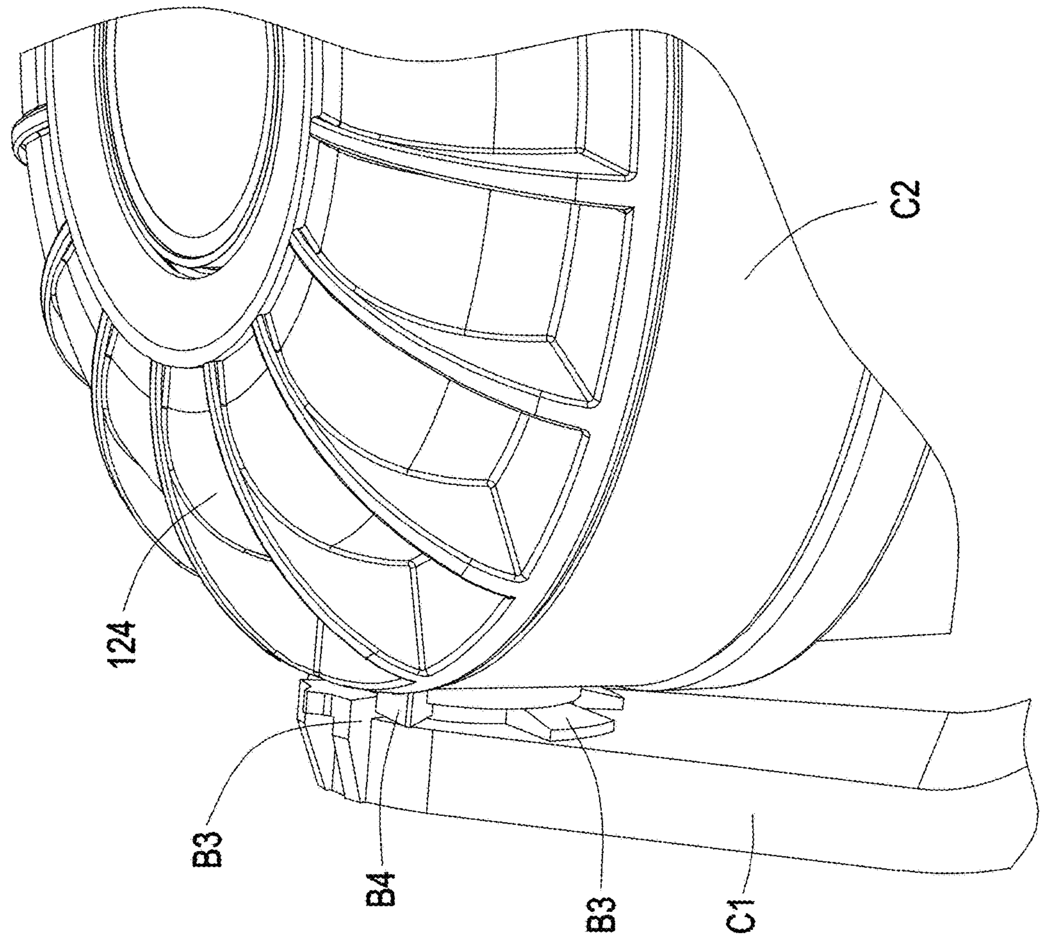
FIG. 12 is a partial enlarged view of the image capturing module in FIG. 6A viewed from another angle.

FIG. 12 is a partial enlarged view of the image capturing module in FIG. 6A viewed from another angle. Referring to FIG. 12, the first rotating member C1 of this embodiment has a stopper B3, and the second rotating member C2 has a stopper B4. The stopper B3 and the stopper B4 are adapted to stop each other to limit the range of the rotation angle of the second rotating member C2 with respect to the first rotating member C1.

Figure 13A:
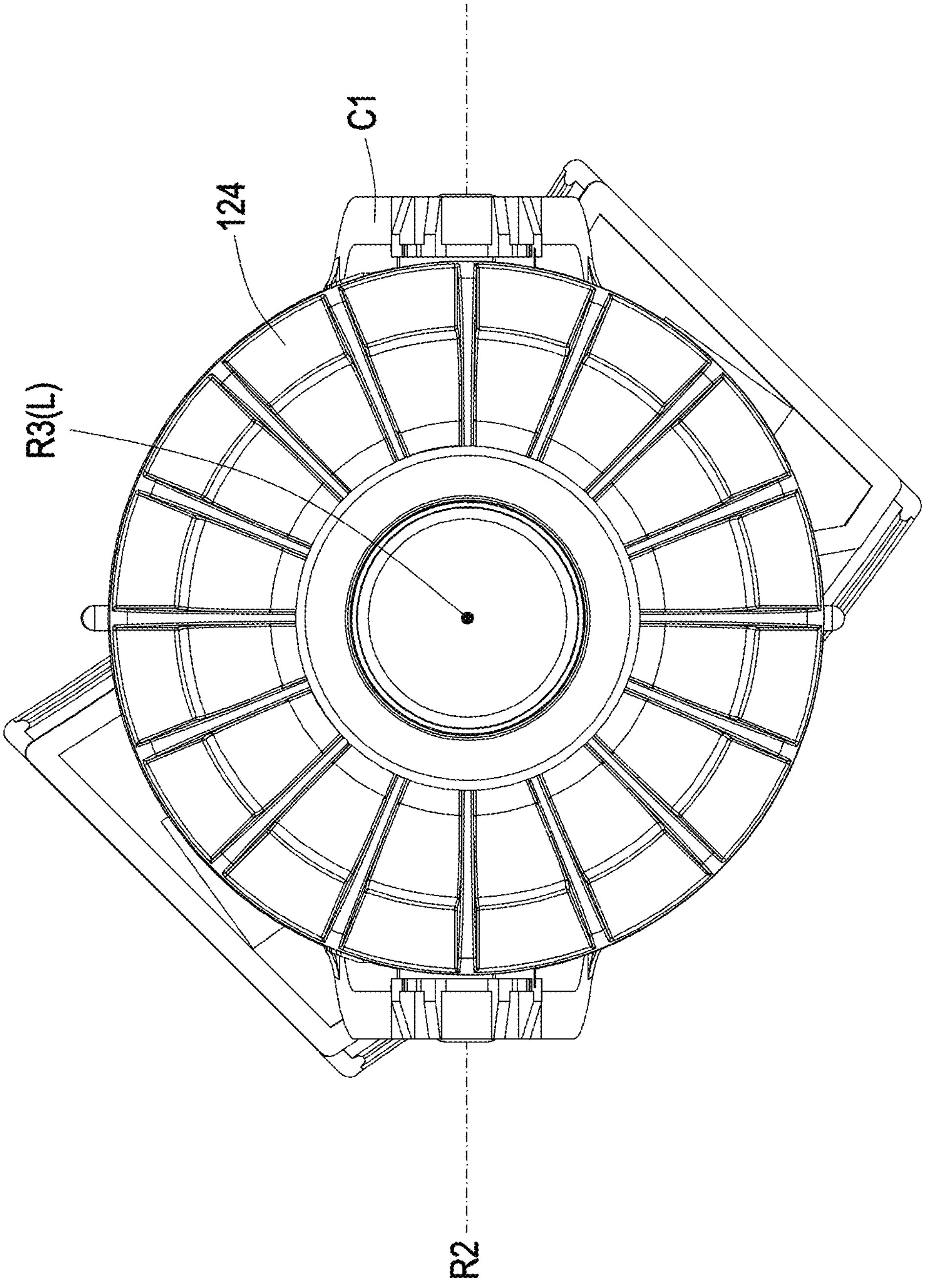
FIG. 13A is a schematic view of the image capturing module in FIG. 6A viewed from another angle.
Figure 13B:
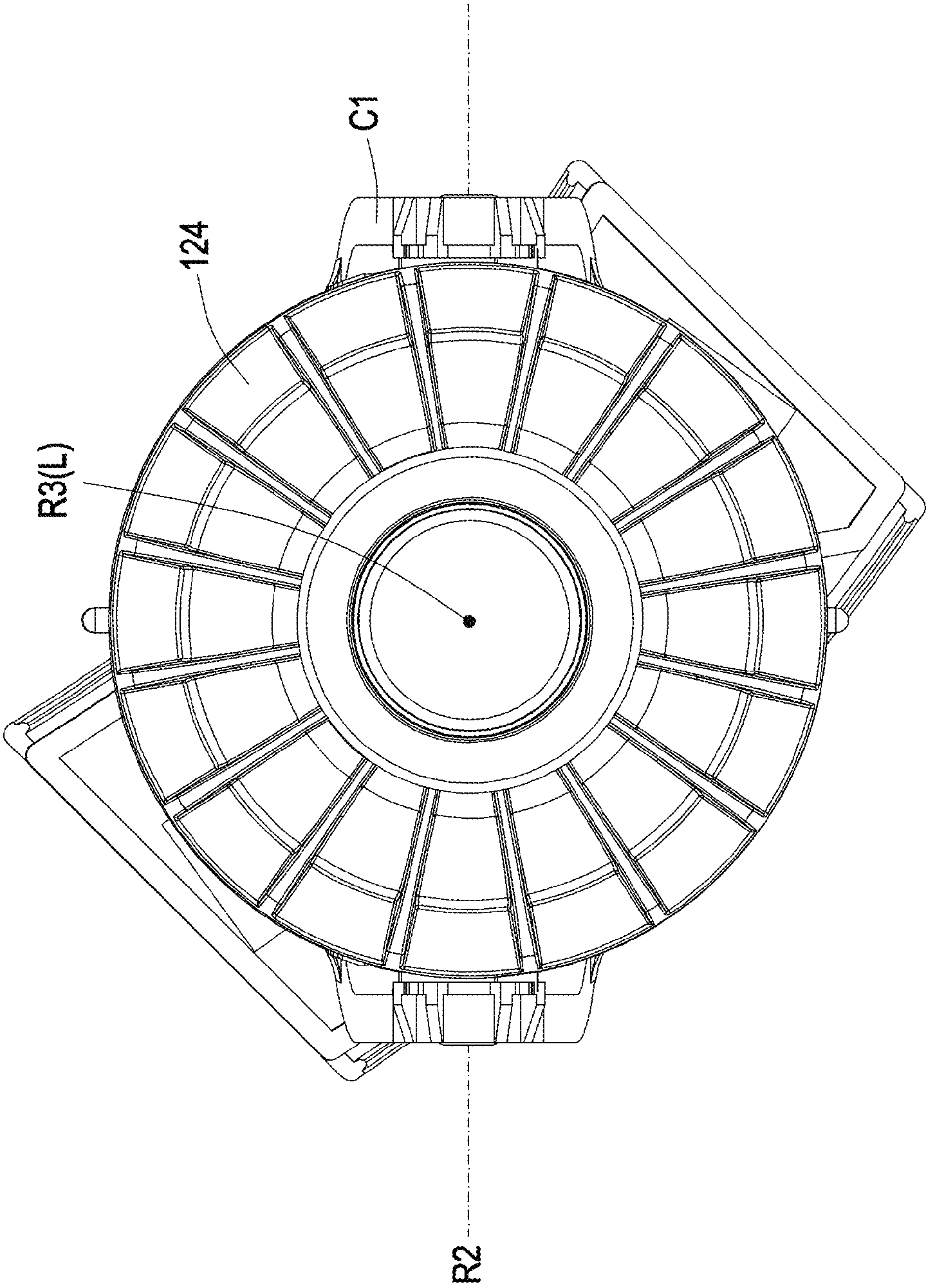
FIG. 13B illustrates rotation of the image capturing unit in FIG. 13A on a third rotation axis.
Figure 14:
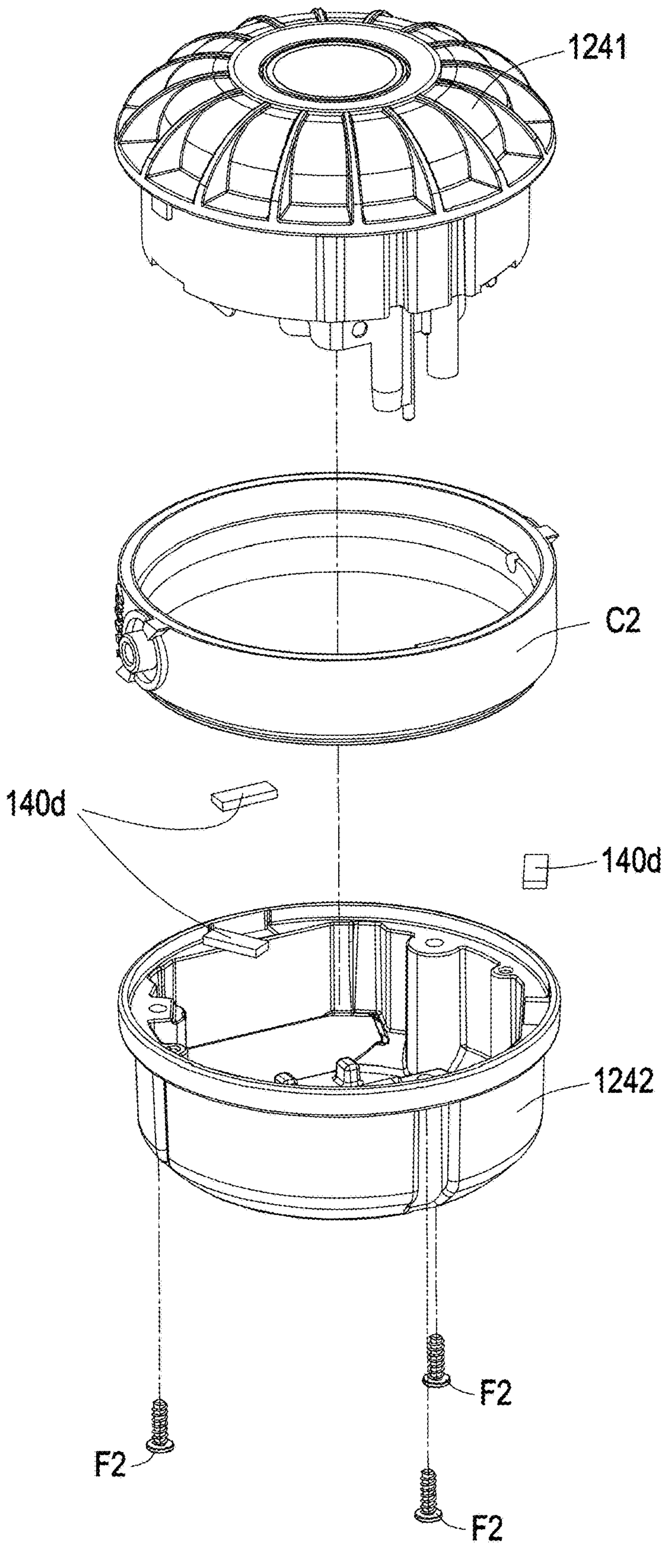
FIG. 14 is an exploded view of the image capturing unit in FIG. 6A.

FIG. 13A is a schematic view of the image capturing module in FIG. 6A viewed from another angle. FIG. 13B illustrates rotation of the image capturing unit in FIG. 13A on a third rotation axis. FIG. 14 is an exploded view of the image capturing unit in FIG. 6A. Referring to FIG. 13A, FIG. 13B, and FIG. 14, the image capturing unit 124 is rotatably disposed on the second rotating member C2 along a third rotation axis R3. In detail, the image capturing unit 124 includes an upper cover 1241, a lower cover 1242, and three fasteners F2. The three fasteners F2 are respectively passed through the lower cover 1242 and fastened to the upper cover 1241 to fasten the upper cover 1241 and the lower cover 1242 to each other. The second rotating member C2 is rotatably disposed around the upper cover 1241 and is located between the upper cover 1241 and the lower cover 1242. The extending direction of the third rotation axis R3 is different from the extending direction of the second rotation axis R2. In this embodiment, the third rotation axis R3 is perpendicular to the second rotation axis R2 as shown in FIG. 13A, and the third rotation axis R3 coincides with an optical axis L of the image capturing unit 124 as shown in FIG. 13A.

In addition, the image capturing equipment 100 further includes a plurality of damping members 140*a*, 140*b*, 140*c*, and 140*d*. The arrangement positions of the damping members 140*a*, 140*b*, 140*c*, and 140*d* will be detailed below. The material of the damping members 140*a*, 140*b*, 140*c*, and 140*d* includes, for example, rubber material, natural rubber, synthetic rubber, composite rubber, thermoplastic polyurethane (TPU), thermoplastic elastomer (TPE), and nitrile butadiene rubber (NBR), but the disclosure is not limited thereto.

As shown in FIG. 5, the damping member 140*a* is disposed between the track 130 and the slider 1221 of the moving assembly 122. In this embodiment, the quantity of the damping member 140*a* is two, but the quantity of the damping member 140*a* is not limited thereto. By disposing the damping member 140*a* between the track 130 and the slider 1221, when the slider 1221 moves around the main body 110, the damping member 140*a* can provide a damping effect between the slider 1221 and the track 130.

As shown in FIG. 8, the damping member 140*b* is disposed between the slider 1221 and the first rotating member C1 of the rotating assembly 1222. In this embodiment, the quantity of the damping member 140*b* is three (as shown in FIG. 7), but the quantity of the damping member 140*b* is not limited thereto. By disposing the damping member 140*b* between the slider 1221 and the first rotating member C1, when the first rotating member C1 rotates with respect to the slider 1221 on the first rotation axis R1, the damping member 140*b* can provide a damping effect between the first rotating member C1 and the slider 1221.

As shown in FIG. 11, the damping member 140*c* is disposed between the first rotating member C1 and the second rotating member C2. In this embodiment, the quantity of the damping member 140*c* is two (as shown in FIG. 10), but the quantity of the damping member 140*c* is not limited thereto. By disposing the damping member 140*c* between the first rotating member C1 and the second rotating member C2, when the second rotating member C2 rotates with respect to the first rotating member C1 on the second rotation axis R2, the damping member 140*c* can provide a damping effect between the first rotating member C1 and the second rotating member C2.

As shown in FIG. 11, the damping member 140*d* is disposed between the second rotating member C2 and the lower cover 1242 of the image capturing unit 124. In this embodiment, the quantity of the damping member 140*d* is three (as shown in FIG. 14), but the quantity of the damping member 140*d* is not limited thereto. By disposing the damping member 140*d* between the second rotating member C2 and the image capturing unit 124, when the image capturing unit 124 rotates with respect to the second rotating member C2, the damping member 140*d* can provide a damping effect between the second rotating member C2 and the image capturing unit 124.

Referring to FIG. 3A, the track 130 of this embodiment is an annular track, and the annular track includes a plurality of arc-shaped tracks 131 that are spliced to each other. In this embodiment, the quantity of the arc-shaped tracks 131 is four, but the quantity of the arc-shaped tracks 131 is not limited thereto. With the track 130 designed as a spliced type as described above, it is possible to avoid the difficulty in mounting the image capturing module 120 to the track 130 due to an overall closed annular shape of the track 130.

Figure 15A:
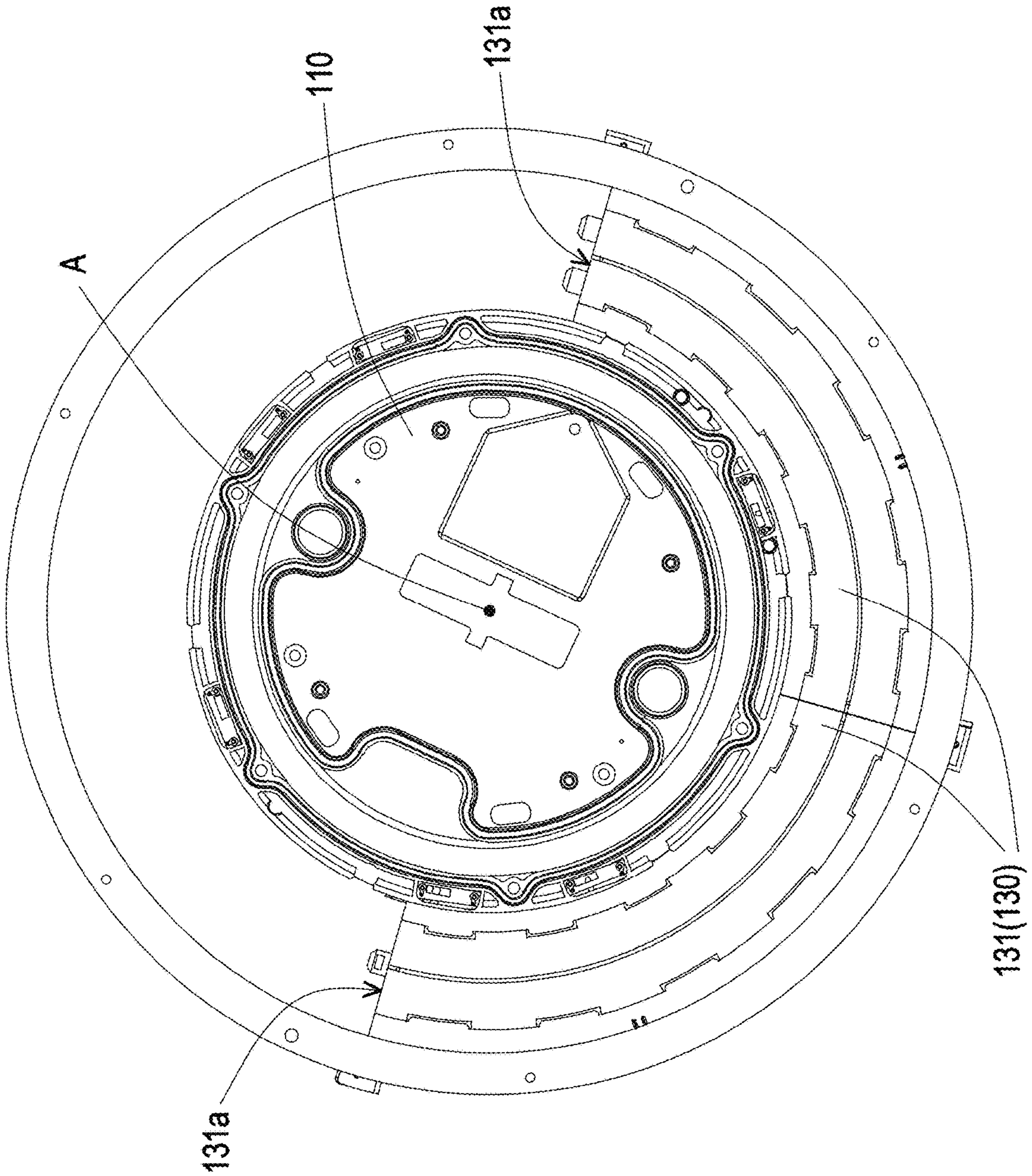
FIG. 15A and FIG. 15B illustrate an assembly process of the image capturing module and the track in FIG. 3A.
Figure 15B:
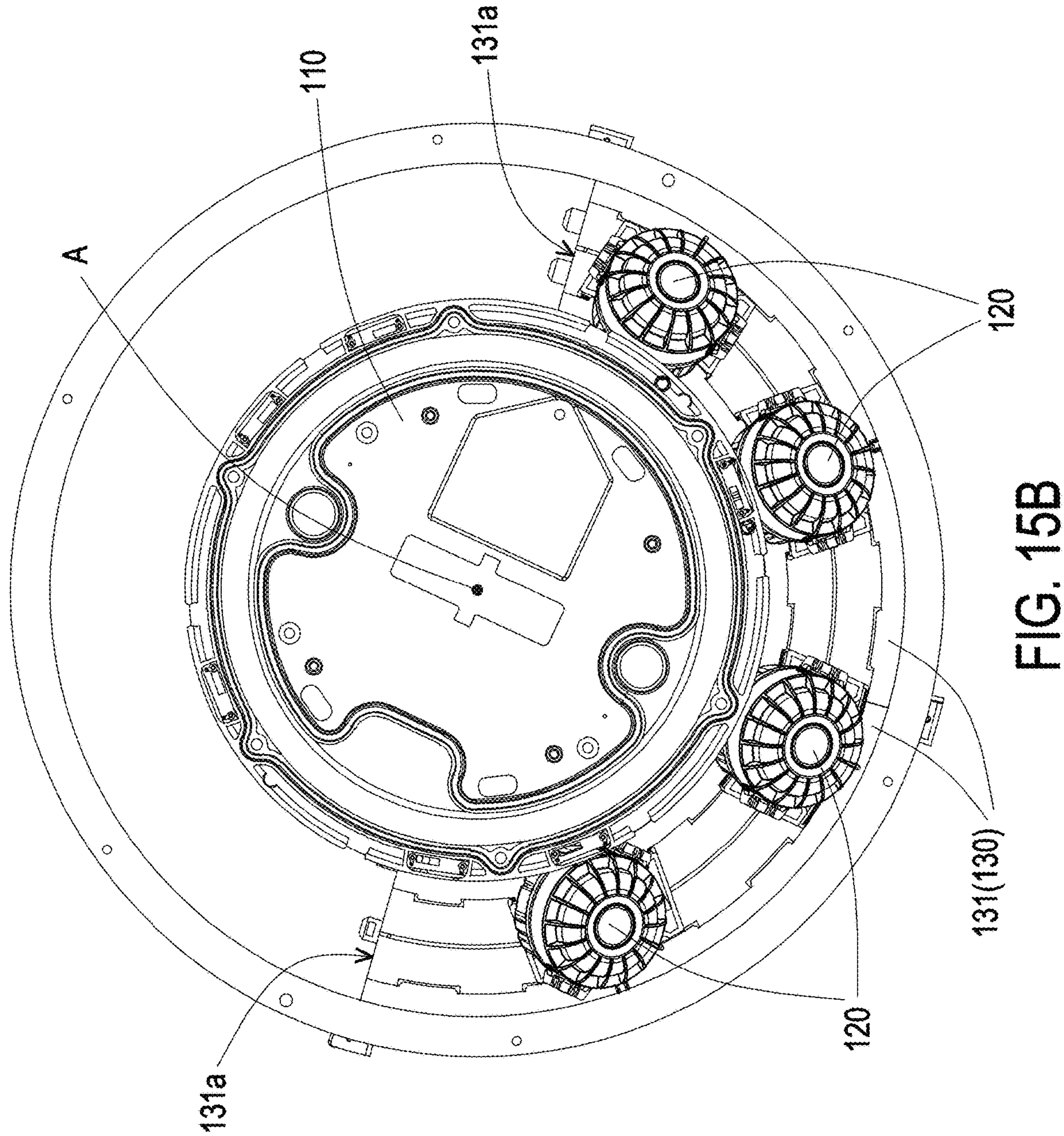

The assembly process of the image capturing module 120 and the track 130 will be described below. FIG. 15A and FIG. 15B illustrate the assembly process of the image capturing module and the track in FIG. 3A. First, as shown in FIG. 15A, two arc-shaped tracks 131 are disposed on the main body 110 and spliced to each other. Then, as shown in FIG. 15B, one or more image capturing modules 120 are slid into the two arc-shaped tracks 131 from an open end 131*a* of the two arc-shaped tracks 131. Then, as shown in FIG. 3A, two other arc-shaped tracks 131 are disposed on the main body 110 and spliced to the two arc-shaped tracks 131. Upon completion of the above assembly, each image capturing module 120 may be moved to any position on the track 130 according to the user's needs.

In addition, referring to FIG. 1, the image capturing equipment 100 further includes a mounting bracket 150. The mounting bracket 150 is connected to the main body 110, and the central axis A passes through the mounting bracket 150. The image capturing equipment 100 may be mounted on the ceiling of a building or other suitable structures via the mounting bracket 150, but the disclosure is not limited thereto.

Figure 16A:
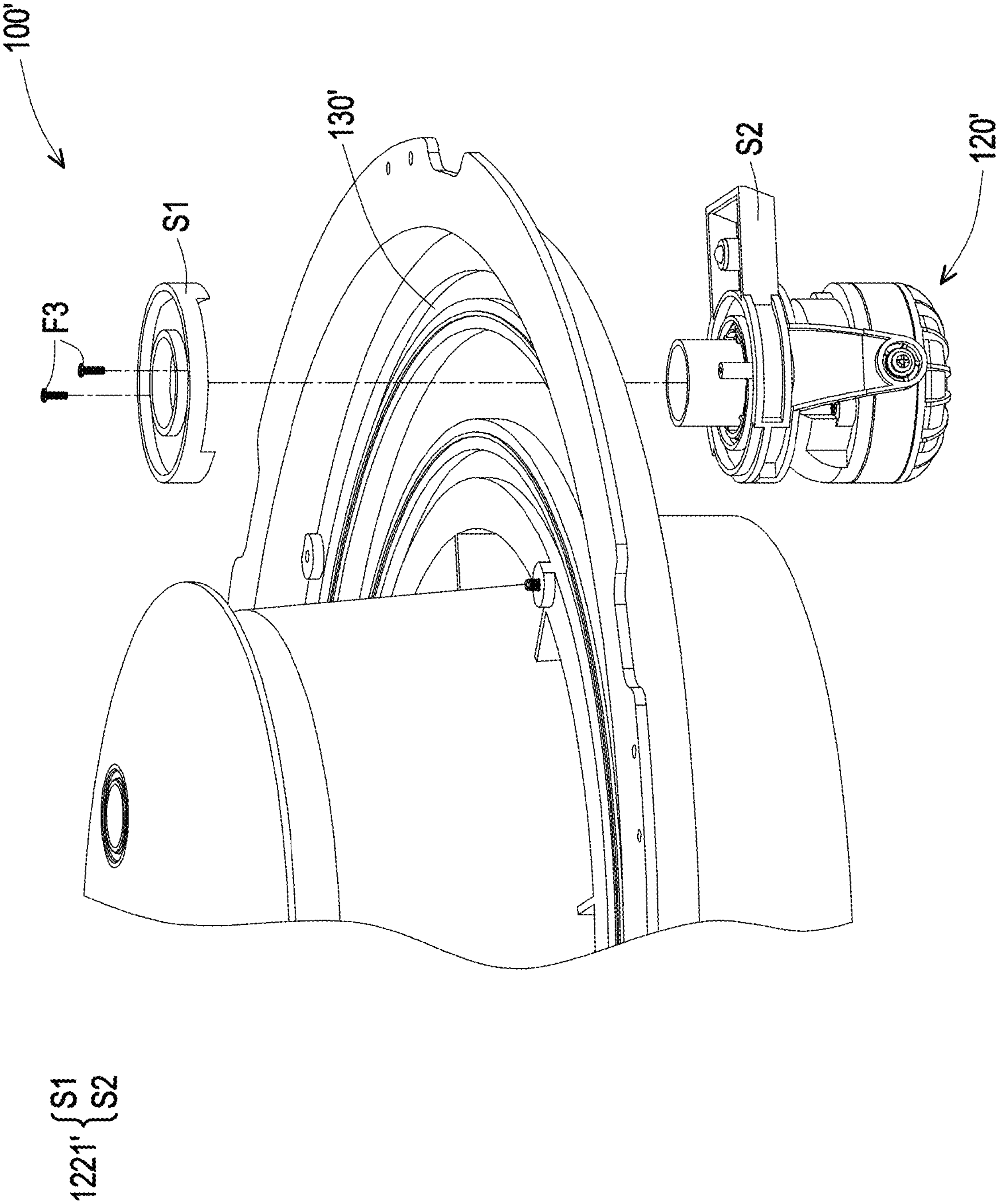
FIG. 16A is an exploded view of an image capturing equipment according to another embodiment of the disclosure.
Figure 16B:
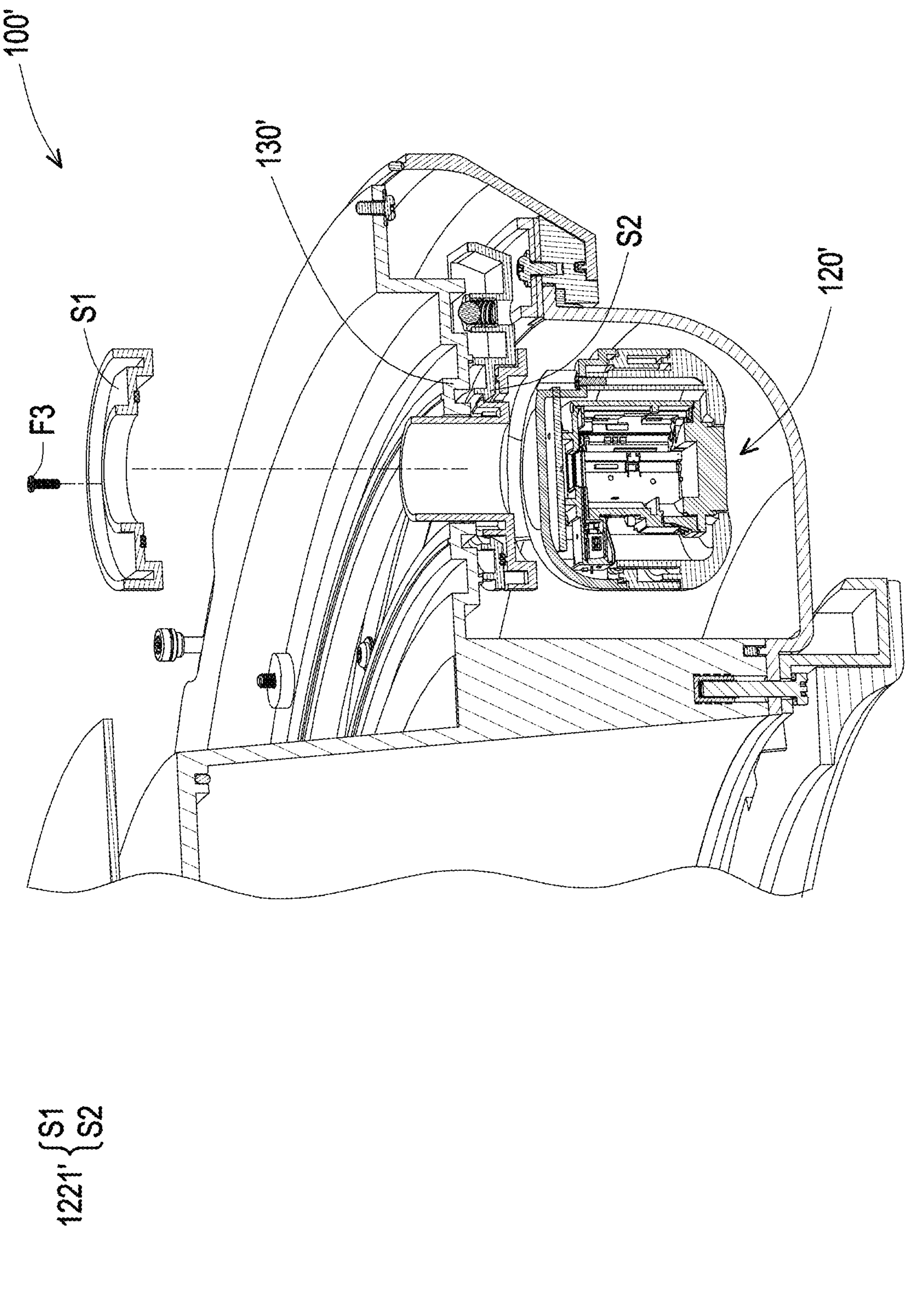
FIG. 16B is a partial cross-sectional view of a second slider of an image capturing module in FIG. 16A disposed on a track.
Figure 16C:
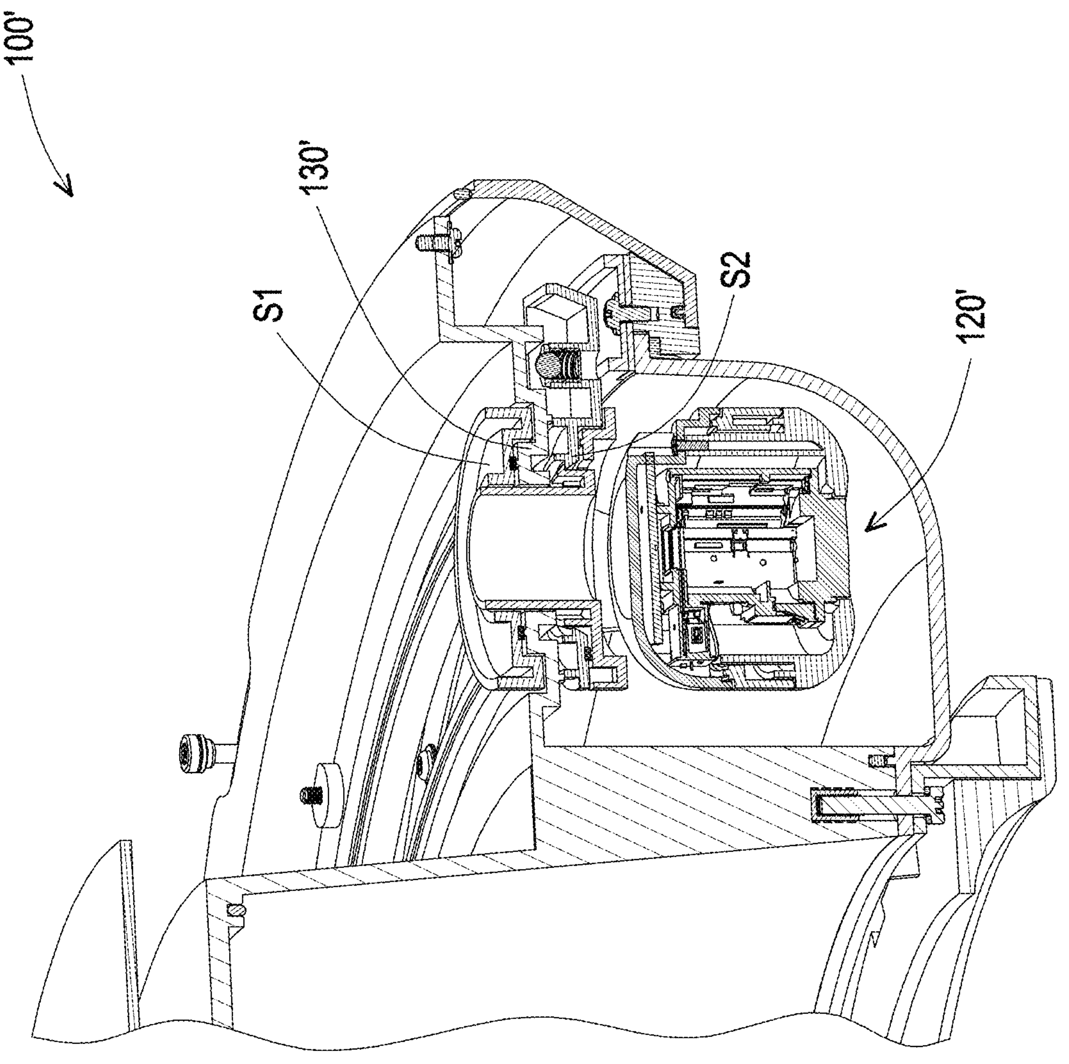
FIG. 16C is a partial cross-sectional view of a first slider of the image capturing module in FIG. 16B disposed on the track.

FIG. 16A is an exploded view of an image capturing equipment according to another embodiment of the disclosure. FIG. 16B is a partial cross-sectional view of a second slider of an image capturing module in FIG. 16A disposed on a track. FIG. 16C is a partial cross-sectional view of a first slider of the image capturing module in FIG. 16B disposed on the track. The difference between an image capturing equipment 100' of this embodiment and the image capturing equipment 100 in FIG. 1 lies in that the method of fixing an image capturing module 120' to a track 130' is different, and that the first limiting member S1 is not included at the track 130' but is included at a slider 1221'. Specifically, referring to FIG. 16A to FIG. 16C, the track 130' and the slider 1221' are limited by the first limiting member S1 and the second limiting member S2, such that the slider 1221' does not fall off the track 130' and is slidable along the track 130'. In this embodiment, the first limiting member S1 is, for example, the first slider of the slider 1221', and the second limiting member S2 is, for example, the second slider of the slider 1221'. When the image capturing module 120' is disposed on the track 130', the track 130' is clamped between the first limiting member S1 and the second limiting member S2.

In this embodiment, the first limiting member S1 and the second limiting member S2 are fastened to each other by two fasteners F3 (e.g., screws). However, the method of fixing the first limiting member S1 and the second limiting member S2 is not limited thereto. In other embodiments, the first limiting member S1 and the second limiting member S2 may also be fixed by a latch, such that the first limiting member S1 and the second limiting member S2 do not separate from each other in a direction perpendicular to the track 130'.

In summary of the above, in the image capturing equipment of the disclosure, the image capturing module not only includes the image capturing unit rotatable on its own axis, but also includes the moving assembly capable of revolving around the main body. Accordingly, the user may change the position of the image capturing module with respect to the main body by the revolution and adjust the rotation angle of the image capturing unit itself by the axial rotation to adapt to various monitoring scenarios. Thus, the image capturing equipment of the disclosure exhibits improved versatility.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image capturing equipment comprising:

a main body;

at least one image capturing module comprising a moving assembly and an image capturing unit, wherein the moving assembly is disposed on the main body movably along a moving path, the moving path encircles a central axis of the main body, and the image capturing unit is rotatably disposed on the moving assembly;

a track disposed on the main body and extends along the moving path, wherein the moving assembly is movably disposed on the track; and at least one damping member directly disposed between the track and the moving assembly.

2. The image capturing equipment according to claim 1, wherein the track is an annular track.

3. The image capturing equipment according to claim 2, wherein the annular track comprises a plurality of arc-shaped tracks that are spliced to each other.

4. The image capturing equipment according to claim 1, wherein the moving assembly comprises a slider and a rotating assembly, the slider is disposed on the main body movably along the moving path, the rotating assembly is rotatably connected to the slider along a first rotation axis, and the image capturing unit is disposed on the rotating assembly.

5. The image capturing equipment according to claim 4, wherein the first rotation axis is parallel to the central axis.

6. The image capturing equipment according to claim 4, further comprising at least one damping member, wherein the at least one damping member is disposed between the slider and the rotating assembly.

7. The image capturing equipment according to claim 4, wherein the rotating assembly comprises a first rotating member and a second rotating member, the first rotating member is rotatably connected to the slider along the first rotation axis, the second rotating member is rotatably connected to the first rotating member along a second rotation axis, and the image capturing unit is disposed on the second rotating member.

8. The image capturing equipment according to claim 7, wherein the second rotation axis is perpendicular to the first rotation axis.

9. The image capturing equipment according to claim 7, wherein the second rotation axis is perpendicular to the central axis.

10. The image capturing equipment according to claim 7, further comprising at least one damping member, wherein the at least one damping member is disposed between the first rotating member and the second rotating member.

11. The image capturing equipment according to claim 7, wherein the image capturing unit is rotatably disposed on the second rotating member along a third rotation axis.

12. The image capturing equipment according to claim 11, wherein the third rotation axis is perpendicular to the second rotation axis.

13. The image capturing equipment according to claim 11, wherein the third rotation axis coincides with an optical axis of the image capturing unit.

14. The image capturing equipment according to claim 11, further comprising at least one damping member, wherein the at least one damping member is disposed between the second rotating member and the image capturing unit.

15. The image capturing equipment according to claim 7, wherein the first rotating member has at least one stopper, the second rotating member has at least another stopper, and the at least one stopper and the at least another stopper are adapted to stop each other to limit a range of a rotation angle of the second rotating member with respect to the first rotating member.

16. The image capturing equipment according to claim 4, wherein the slider has at least one stopper, the rotating assembly has at least another stopper, and the at least one stopper and the at least another stopper are adapted to stop each other to limit a range of a rotation angle of the rotating assembly with respect to the slider.

17. The image capturing equipment according to claim 1, wherein the at least one image capturing module comprises a plurality of image capturing modules, and any one of the image capturing modules is adapted to move along the moving path with respect to the other image capturing modules among the image capturing modules.

18. The image capturing equipment according to claim 1, further comprising a mounting bracket, wherein the mounting bracket is connected to the main body, and the central axis passes through the mounting bracket.

19. An image capturing equipment comprising:

a main body;

at least one image capturing module comprising a moving assembly and an image capturing unit, wherein the moving assembly is disposed on the main body movably along a moving path, the moving path encircles a central axis of the main body, and the image capturing unit is rotatably disposed on the moving assembly; and a track disposed on the main body and extends along the moving path, wherein the moving assembly is movably disposed on the track, wherein the track is an annular track and the annular track comprises a plurality of arc-shaped tracks that are spliced to each other.

* * * * *